United States Patent [19]

Kuryluk

[11] 4,141,204
[45] Feb. 27, 1979

[54] ROTARY PICKER FOR HARVESTING FRUIT

[76] Inventor: Michael H. Kuryluk, 7 Cornwall St., Lower Sackville NS, Canada, B4C 1J2

[21] Appl. No.: 778,728

[22] Filed: Mar. 17, 1977

[51] Int. Cl.² ............................................. A01D 46/00
[52] U.S. Cl. ...................................... 56/330; 56/130; 56/364
[58] Field of Search ................. 56/330, 130, 364, 226; 171/92

[56] References Cited

U.S. PATENT DOCUMENTS

| | | | |
|---|---|---|---|
| 1,632,597 | 6/1927 | Hall | 56/330 |
| 2,508,401 | 5/1950 | Kirk | 56/130 |
| 2,780,905 | 2/1957 | Darlington | 56/330 |
| 3,648,447 | 3/1972 | Burton | 56/330 |
| 3,675,406 | 7/1972 | Grant | 56/330 |
| 3,705,483 | 12/1972 | Jarrell | 56/226 |

*Primary Examiner*—Jay N. Eskovitz
*Attorney, Agent, or Firm*—Otto John Munz

[57] ABSTRACT

A rotary picker drum for use in a machine for harvesting fruit on a relatively low plants, such as low bush blueberries. The drum contains a series of circumferentially spaced rows of tines which can be retracted during the descending movement thereof as the drum rotates, and extended during the passage of the respective row through the bush and over substantial portion of the upward movement as the drum is rotated. The oscillatory extension/retraction movement is effected within a cylindric plane generally coaxial with the axis of rotation of the drum, the tines of the rows being curved such as to be generally coincident with such cylindric plane. The tines are guided in guiding plates forming one wall of a food collecting trough in the surface of the drum. The guiding plates reinforce the tines and clean same during the retracting movement thereof.

12 Claims, 4 Drawing Figures

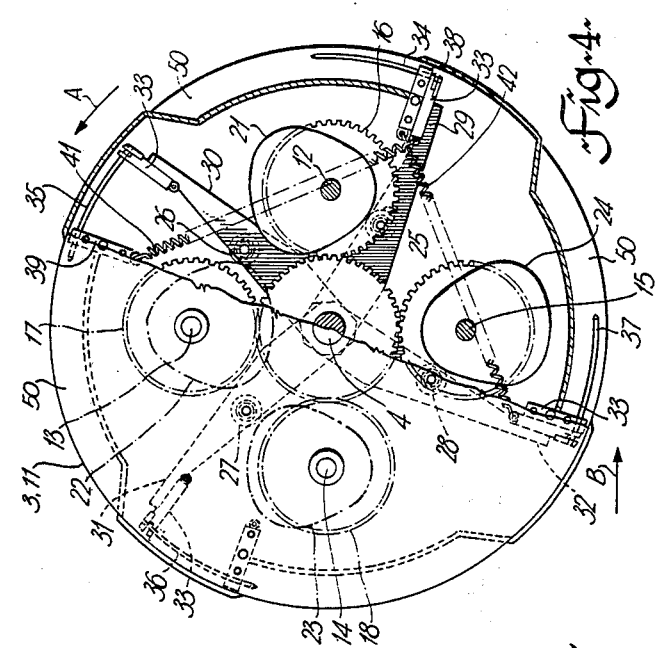
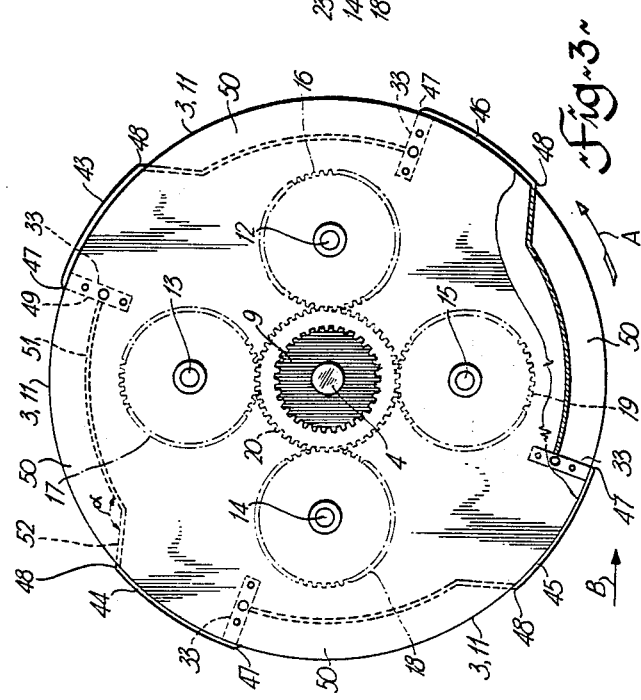

ROTARY PICKER FOR HARVESTING FRUIT

The present invention relates to fruit harvesting machines of the type used in harvesting fruit on relatively low plants, such as low bush blueberries.

The art to which the present invention relates is represented by Canadian Pat. No. 961,275 issued Jan. 21, 1975 to Charles G. Burton. A typical fruit harvesting machine of this type contains a drum or frame rotatable about a horizontal axis at the front end of a mobile machine, the periphery of such drum structure normally carrying a plurality or rows of tines intended to "comb" the bush to pick up the fruit. The picked-up fruit is then removed from the drum area either into a trough inside the drum or to a collection trough located outside the drum near the periphery thereof. In general terms, the operation of this type of machine is intended to simulate to the maximum extent the mechanics of picking blueberries with a hand rake. It is preferable to have each of the rows of tines of the harvesting machine of the above type movable relative to the drum from an extended position to a retracted position, to clear the respective row of tines of the fruit. In the known machines, such movement of the rows is effected by pivotal movement of the respective row about an axis generally coincident with the periphery of the picker drum so that in an extended position, the respective row protrudes beyond the periphery of the drum while in the retracted position, the respective row is generally coincident with the periphery of the drum.

One of the disadvantages of the known drum-type pickers is that the tines are not actually inserted into the bush with their tips first. Instead, due to the protruding arrangement of the rows, the respective rows enter the bush in a somewhat side-wise fashion which results not only in an unnecessary damage to the bush but also in losses of the picked-up fruit. The known machines of the drum-picker type further require a cleaning device, such as a rotary brush which is located near the periphery of the drum, usually near the upper portion thereof, to remove from the tines any berries, leaves or twigs not removed from the respective tines by gravity. The rotary brush presents an additional, relatively complex integer of the overall machine. A further drawback of the known machines is that the rows of tines are normally mounted for pivotal movement relative to the frame of the drum but are not protected against accidental damage, e.g. when a row hits a solid object such as a rock or the like on the ground.

It is an object of the present invention to provide a rotary picker for use in machines of the above type which would not only improve the operativeness of the device but would also provide a relatively simple mechanism less subject to damage and more efficient in operation.

According to the present invention, a rotary picker is provided for use in a machine for harvesting fruit on relatively low plants such as low bush blueberries. The picker is of the type of a driven, rotary drum including means for securing the drum to a mobile frame for rotation in a predetermined direction about a generally horizontal axis disposed transversely of said frame near the front end thereof. The picker includes, in combination, a plurality of generally straight rows of cantilevered tines, said rows being each disposed near the periphery of said drum, extending in a generally axial direction relative to said drum and being generally equidistantly spaced from each other. They are also equidistantly spaced from the axis of rotation of the drum. Means are provided for imparting oscillatory movement to each of said rows along a predetermined arcuate locus, the locus being a segment of a cylindric surface generally coaxial with the axis of rotation of the drum. Each of the rows of tines is curved such as to be generally coincident with the respective arcuate locus, whereby all of the tines of the picker are arranged to circumscribe, during the rotation of the drum, a common, generally cylindric surface, while said rows can simultaneously move relative to the drum within the generally cylindric surface. The machine includes tine guide means of the type of plates each of which extends along the respective row of tines and has openings for generally slidably receiving a portion of the respective tines of the associated row during the oscillatory movement thereof. Accordingly, the respective row can assume, relative to the associated plate, a retracted position wherein the openings in the plate surround free end portions of the respective tines of the row, and an extended position wherein the openings surround cantilevered end portions of the tines of the respective row, with the tips of the tines extending forwardly from the respective plate.

In a preferred embodiment, the individual rows of tines are fixedly secured to the free end of arm means arranged for a rotating with the drum and for a additional, limited arcuate movement about the axis of the drum.

The invention will be described in greater detail with reference to one embodiment, it being understood that different modifications may be effected to such embodiment without departing from the scope of the present invention.

The drawings are schematic representations of said one embodiment of the present invention. In the drawings:

FIG. 3 is a side view of the drum with certain parts omitted, as seen from the left of FIG. 2; and FIG. 4 is a partial side view similar to that of FIG. 3, with one end wall of the drum partially broken away to show further elements of the device according to the present invention.

Figure 1:
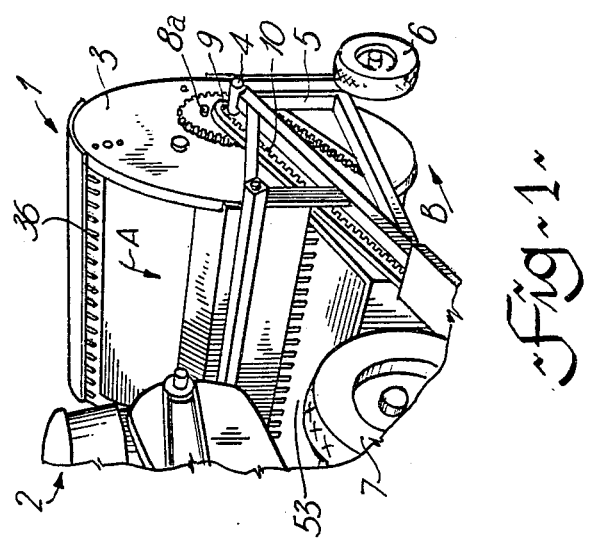
FIG. 1 is a schematic perspective view showing the picker drum as mounted in a harvesting machine, the harvesting machine being only partly shown.

Referring to FIG. 1, a rotary picker 1 is shown which is mounted in a machine 2 for harvesting fruit on relatively low plants such as low bush blueberries. The picker 1 is of the type of a drum having an end wall 3 which is rotatable, together with the entire drum, about a stationary shaft 4 fixedly secured to a frame 5 of the machine 2. The frame 5 is supported at the front end of the machine 2 and has wheels 6 (only one visible in FIG. 1). The machine 2 includes a pair of drive wheels 7 (only one visible in FIG. 1).

Fixedly secured to the end wall 3 by conventional means, such as carrier pins 8a of the drum picker 1 are two sprockets 8, 9, the sprocket 9 in FIG. 1 being shown in engagement with a drive belt 10. The opposite end of the drive belt 10 is operatively associated with a drive motor which forms the part of machine 2 (drive motor not shown) to rotate the picker 1 in a predetermined direction marked with an arrow A. The drive motor of the machine 2 is also arranged to drive wheels 7 of same to advance the whole assembly generally in the direction of an arrow B. It will be appreciated that either of the sprocket wheels 8, 9 forms transmission means for driving the drum 1 for rotation.

Figure 2:
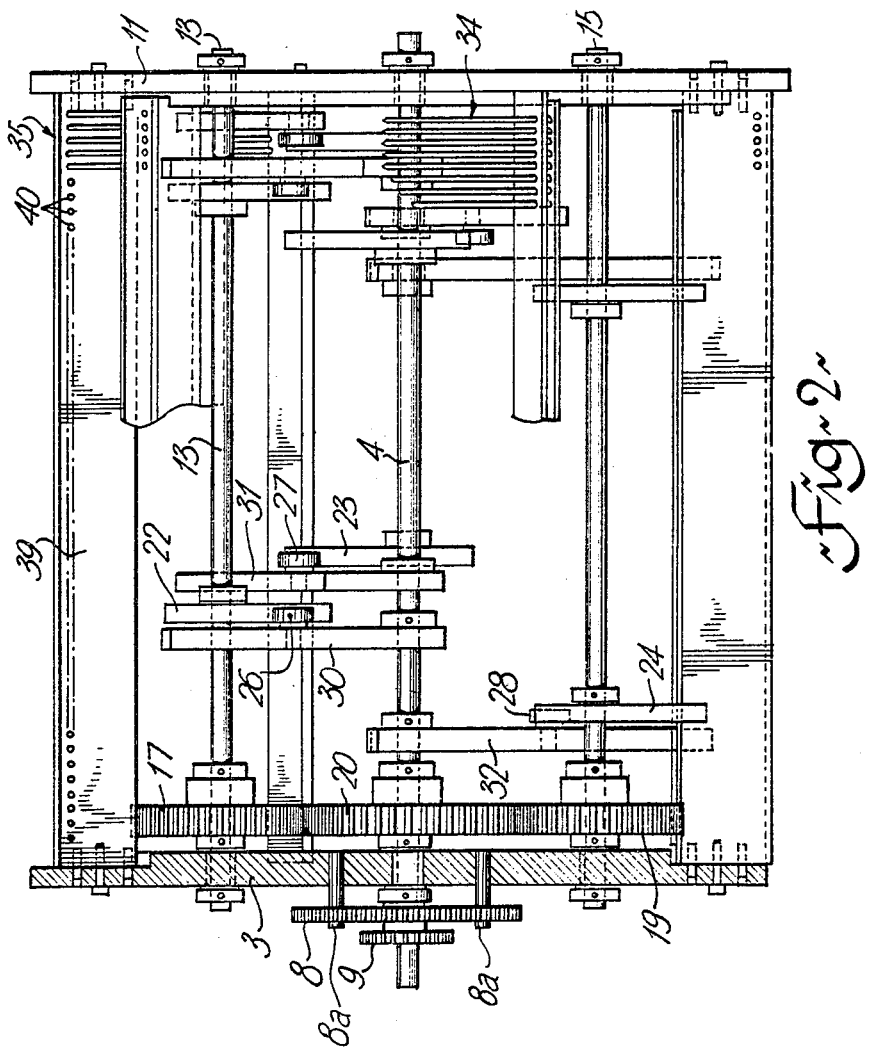
FIG. 2 is a longitudinal section of the rotary picker according to the present invention, as viewed from the front of the machine shown in FIG. 1.

The shaft 4 extends throughout the drum, as best seen in FIG. 2 and its both ends are fixedly secured to the frame 5. Thus, when the drive belt 10 is driven, the sprocket 9 turns about the stationary shaft 4 to rotate the end wall 3 and with it the entire drum picker 1.

The end of the drum picker opposite to that shown in FIG. 1 has an end wall 11 (FIG. 2) which, of course, is also rotatable about the stationary shaft 4.

Mounted for rotation in the end walls 3, 11 (FIG. 2) are four planetary shafts 12, 13, 14 and 15 (only shafts 13 and 15 being visible in FIG. 2). Fixedly secured to each of the planetary shafts 12-15 is a planet gear 16-19, respectively. The planet gears 16-19 are in permanent engagement with a sun 20 which is fixedly secured to the stationary shaft 4 of the drum 1. It will thus be appreciated that the planetary shafts 12-15, follow the planetary motion of planet gears 16-19 once the drum 1 is driven to rotate.

Fixedly secured to each of the planetary shafts 12-15 is a pair of cams of identical configuration and arrangement relative to the individual shaft, the cams forming each of the pairs of cams being axially spaced from each other. It is to be appreciated at this point that only some of the cams are shown in the drawings, to facilitate the examination of the drawings. Thus, the shaft 12 in FIG. 4 is shown as having a cam 21, the shaft 13 is provided with a cam 22 and the shafts 14 and 15 have cams 23, 24, respectively. The periphery of the cams 21-24 is in engagement with followers 25-28, respectively. Each of the followers 25-28 is of the type of a roller pivotally secured one to each of the respective arms 29, 30, 31 and 32. The arms 29-32 are all pivotal about the stationary shaft 4. It will thus be appreciated that the cams 21-24 are capable of generating an oscillatory arcuate movement of arms 29-32 relative to the structure of the drum 1, while the entire assembly rotates about the shaft 4.

The free ends of arms 29-32 are each provided with a holder 33 (marked only in FIG. 4) and each of the holder carries, in cantilevered fashion, a generally straight row of arcuate curved tines. Thus, arm 29 carries a row 34 (only one of the tines being visible in FIG. 4 and only eight of such tines being shown in FIG. 2). Similarly, the arm 30 carries a row 35 of tines (only five tines of row 35 being shown in FIG. 2), while arms 31 and 32 are provided with rows 36, 37 of arcuate tines.

As seen from FIG. 4, the holder 33 of arm 29 abuts against a guide plate 38 fixedly secured to the drum 1. Similarly, the holder 33 of arm 30 is arranged to abut against a guide plate 39 in the position of FIG. 4, however, it will be appreciated that the arm 30 is shown in a position wherein the holder 33 is remote from its associated guide plate 39. The remaining holders 33 of arms 31 and 32 are also arranged to abut against their respective guide plates. The structure of the four guide plates is identical to each other and can be appreciated from FIG. 2 wherein the guide plate 39 is shown to have a horizontal row of tiny openings 40 for slidably receiving the tines of the row 35. The tines of the rows 34, 36 and 37 are similarly received in corresponding openings of their associated drive plates. The size of the openings 40 is selected such as to allow a free, generally sliding movement of the respective tines of rows 34-37 therein.

The row 35 in FIG. 4 is shown in a retracted position wherein the openings 40 surround free end portions of the respective tines of row 35. On the other hand, the row 34 is shown in an extended position, wherein the respective openings in the guide plate 38 surround cantilevered end portions of the tines of the row 34.

Referring now particularly to FIG. 4, it will be seen that the holder 33 of the arm 29 is provided with an eye for securing the holder and thus the arm to one end of a tension spring 41, the opposite end of the spring 41 being secured to the guide plate 39 immediately ahead (from the standpoint of rotation of the drum) of the guide plate 38. Thus, the tension of spring 41 normally urges the arm 29 and its associated follower 25 into contact with the periphery of cam 21. As shown in FIG. 4, a similar spring 42, which is slightly axially spaced from spring 41, is arranged to urge the follower 28 of arm 32 into contact with the cam 24. A similar arrangement, not shown in the drawings, is provided for the remaining two arms 30, 31. It will thus be appreciated that the retracting movement of the row 34 takes place during the rotation of the drum whereby the row 34 eventually assumes the position of row 35 as shown in FIG. 4. The retracting movement is caused by the appropriate rotation of cam 21, urging the arm 29 against the action of the spring 41. It will also be appreciated from FIG. 4 that if the tips of tines of the row 34 should become hit in peripheral direction against the rotation of the drum, the arm 29 can become resiliently retracted against the action of spring 41 out of the contact with cam 21.

The generally cylindric surface of the drum 1 will now be described in greater detail with reference to FIG. 3 which shows that the two circular end walls 3, 11, define the outer periphery of the cylindric surface with four, equidistantly spaced, arcuate wall segments 43, 44, 45, and 46 being fixedly secured to the end walls 3, 11 and to further associated portions of the drum periphery as referred to hereinafter.

From the standpoint of rotation of drum 1, the wall segments 43-46 have each a leading edge 47 and a trailing edge 48. The respective holders 33 are generally planar plates extending axially of the drum and having a planar surface disposed in a generally radial direction relative to the axis of rotation of the drum 1. Thus, the holder 33 at the leading edge 47 of the arcuate wall segment 43 defines a trailing end wall 49 of a depression 50. At a point spaced from the periphery of drum 1, the trailing end wall 49 merges with the trailing end of an arcuate bottom wall 51 whose leading end, in turn, merges with an obliquely inclined end wall 52 of the depression 50. The integers 49, 51 and 52 are only marked in the uppermost depression 50 as viewed in FIG. 3, it being understood that the shape and overall arrangement of the remaining three depressions 50 is identical to the one described. Thus, each of the depressions is defined at the ends thereof by the associated portion of the end walls 3, 11 and by the trailing end wall 49, bottom wall 51 and leading end wall 52. It will be appreciated that the surface of the trailing end wall 49 can also be defined as being coincident with the plane extending in radially-axial direction relatively to the drum. Similarly, it will be appreciated that the arrangement of the leading end wall of each depression is generally coincident with a plane disposed at an obtuse angle $\alpha$ as measured at the joinder of the bottom wall 51 and the leading wall 52.

Turning now to FIG. 4, it will be appreciated that each of the depressions 50 can ultimately be fully open (the uppermost depression 50 in FIG. 4) or partly covered by the row of tines, such as in the depression 50 at the right hand side of FIG. 4, which is shown partly covered by the row 34 of tines. It is further to be appreciated from FIG. 4 that the tines of the rows 34-37 are at no times located beyond the cylindric periphery circumscribed by the wall segments 43-46.

In operation, the machine is driven over a field of blueberries with the outside periphery of the drum (generally corresponding to the cylindric surface circumscribed by wall segments 43-46) suitably spaced above the ground.

It will be appreciated from FIG. 4, for instance, that the cylindric surface circumscribed by the drum can generally be divided into an uppermost section (approximately the area in which the guide plate 39 is located) a lowermost section (the area of the row 37 in FIG. 4) an ascending segment (within which the row 34 is located in FIG. 4) and a descending segment (within which the row 36 is located in FIG. 4). The cam mechanism, which represents one embodiment of what could generally be referred to as "means for imparting oscillatory movement to the respective rows" 34-37, are so arranged that when any of the rows 34-37 approaches the lowermost area of row 37 in FIG. 4, the respective row is brought into a fully extended position as shown in FIG. 4. The row remains fully extended over a substantial portion of the ascending section of the cylindric surface (see row 34) and eventually becomes retracted as it nears the uppermost section (row 35 in FIG. 4). During the travel over a substantial portion of the descending segment of the part of rotation the rows remains retracted such as shown in row 36 of FIG. 4. It will be appreciated that the row 37 as shown in FIG. 4 is in engagement with the low bush of blueberries and as it ascends, the fruit together with leaves and twigs are removed from the bush and accumulated in the associated depression 50. As the row (34) remains in extended or "closed" position relative to the depression 50 during the ascending motion, the picked-up fruit remains between the row 34 and the bottom wall 51 of the associated depression. Once the respective depression reaches the uppermost position, the tines of the row (35) become retracted. Due to the passage of the individual tines 55 through the associated openings 40 of the cooperating guide plate 39, any fruit, leaves, etc. that might become stuck to the tines are removed to fall into the respective depression 50. As the depression 50 moves further to the left of FIG. 4, the accumulated fruit is free to fall out of the depression into a container 53 (FIG. 1) for accumulation and further processing. Following the emptying of the respective depression 50, the tines are again extended and the whole process is repeated.

It will be appreciated that the penetration of the bush by the tines of individual rows 34-37 is virtually identical to hand raking of the bush due to the arcuate arrangement of the tines which is generally identical with a cylindric surface circumscribed during the rotation of the drum. In other words, the direction of penetration with respect to the elongation of the tines is virtually identical with elongation of the tines except for slight distortion due to the advance B of the machine 2. The ascending movement of the respective rows 34-37 then "combs" the bush in much the same manner as in raising of a hand rake.

The tines of the rows 34-37 can be forced into retracted position should the row at the lowermost position hit an obstacle such as a rock in the ground or the like, to avoid the breakage of the tines. Moreover, the tines are more firmly mounted in the drum due to the guiding effect of the respective guide plates 38, 39.

The rows of tines are at all times spaced inwardly from the outermost periphery of the drum and are thus protected from most of the damage practically encountered in the harvesting of blueberries.

Those skilled in the art will readily conceive further embodiments of the present invention differing from the above specification. For instance, the arrangement of the movement of the rows 34-37 may be entirely different and may be effected by known pneumatic or hydraulic means. Four rows of tines have been disclosed without, however, limiting the scope of the present invention to such number. Similarly, even in a mechanical arrangement, the number and arrangement of the cams may differ from the disclosed arrangement.

There are many other modifications not mentioned hereinbefore which would still clearly fall within the scope of the present invention as defined in the accompanying claims.

The embodiments of the invention in which an exclusive property or privilege is claimed are defined as follows:

1. A rotary picker for use in a machine for harvesting fruit on relatively low plants such as low bush blueberries, said picker being of the type of a driven, rotary drum, including means for securing the drum to a mobile frame for rotation about a generally horizontal axis disposed transversely of said frame near the front end thereof, said picker including, in combination:

transmission means for driving said drum to rotate in said predetermined direction;

a plurality of generally straight rows of cantilevered tines, said rows being each disposed near the periphery of said drum, extending in a generally axial direction relative to said drum, and being generally equidistantly spaced from one another and from the axis of rotation of said drum;

means for imparting to each of said rows an oscillatory movement relative to said drum along a predetermined, arcuate locus;

said arcuate locus being a segment of a cylindric surface generally coaxial with the axis of rotation of said drum.

2. A device as claimed in claim 1, wherein said tines of each of the rows are curved such as to be generally coincident with the respective arcuate locus, whereby all of the tines of the picker are arranged to circumscribe a generally common cylindric surface as the drum is rotated, while each of said rows is simultaneously movable relative to said drum within said common, generally cylindric surface.

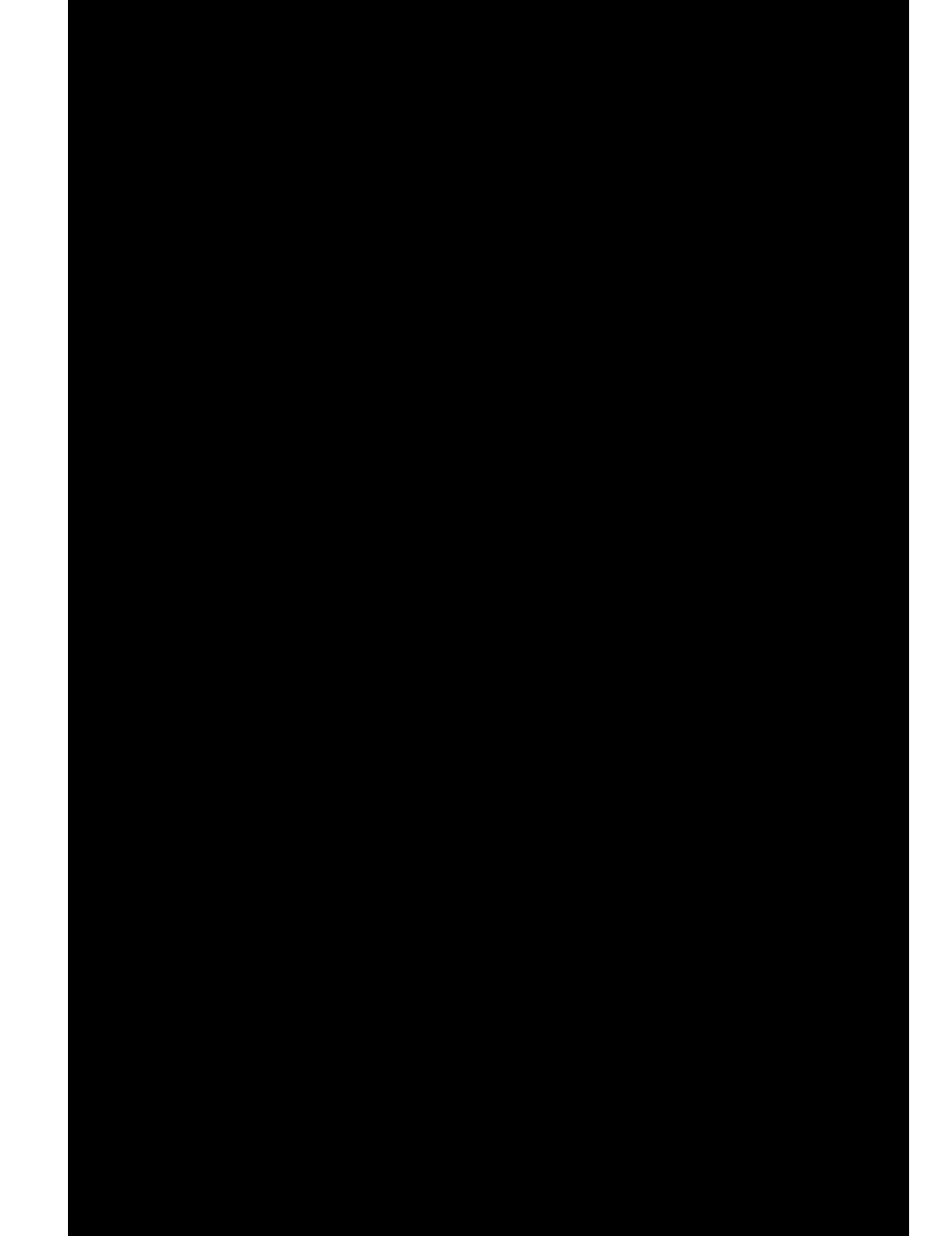

3. A device as claimed in claim 2 comprising tine guide means secured to said drum, said guide means being of the type of plates, each of said plates extending along the respective row of tines and having openings for generally slidably receiving a portion of respective tines of the associated row during the oscillatory movement thereof, whereby said respective row can assume, relative to the associated plate, a retracted position wherein said openings surround free end portions of the tines and an extended position wherein said openings surround sections of the tines near the cantilevered end portions thereof.